United States Patent [19]

Janiszewski et al.

[11] Patent Number: 4,676,354
[45] Date of Patent: Jun. 30, 1987

[54] MOTOR, BRAKE AND BEARING CONTROLLED HILL HOLDER

[75] Inventors: Grzegorz Janiszewski; Thomas Sahlmen, both of Gothenburg, Sweden

[73] Assignee: AB Volvo, Gothenburg, Sweden

[21] Appl. No.: 802,157

[22] Filed: Nov. 25, 1985

[30] Foreign Application Priority Data

Nov. 23, 1984 [SE] Sweden ............................. 8405921

[51] Int. Cl.$^4$ .............................................. B60K 41/28
[52] U.S. Cl. .................... 192/0.044; 192/0.09; 192/3 H
[58] Field of Search ............. 192/3 H, 3 TR, 3 N, 192/4 A, 13 A, 0.09, 0.049, 1, 2, 0.076, 0.044, 103 R

[56] References Cited

U.S. PATENT DOCUMENTS 3,870,119  3/1975  Wurst ........................ 192/3 TR X
4,462,487  7/1984  Warwick et al. .................. 192/4 A
4,561,527  12/1985  Nakamoto et al. .

FOREIGN PATENT DOCUMENTS 0131411  1/1985  European Pat. Off. ......... 192/0.049

*Primary Examiner*—George H. Krizmanich
*Attorney, Agent, or Firm*—Young & Thompson

[57] ABSTRACT

A device for motor vehicle braking systems, which is designed to facilitate starting on hills. The device comprises a piston cylinder device, controlled by an electronic unit which is coupled to a pneumatic or hydraulic pressure system and acts on the brake pedal. Signals are fed to the electronic unit from a sensor for vehicle speed and direction and from a pair of sensors sensing brake pedal position and gas pedal position. When the signals from the first-mentioned sensor indicate that the vehicle has been brought to a stop after movement in a direction differing from the direction selected via the gear selector and indicated by sensor, at the same time as the two other sensors signal that the brake pedal has been depressed and the gas pedal has been released, the piston cylinder device is activated to brake the vehicle. If the accelerator is then depressed the device is deactivated and the brake is released.

9 Claims, 1 Drawing Figure

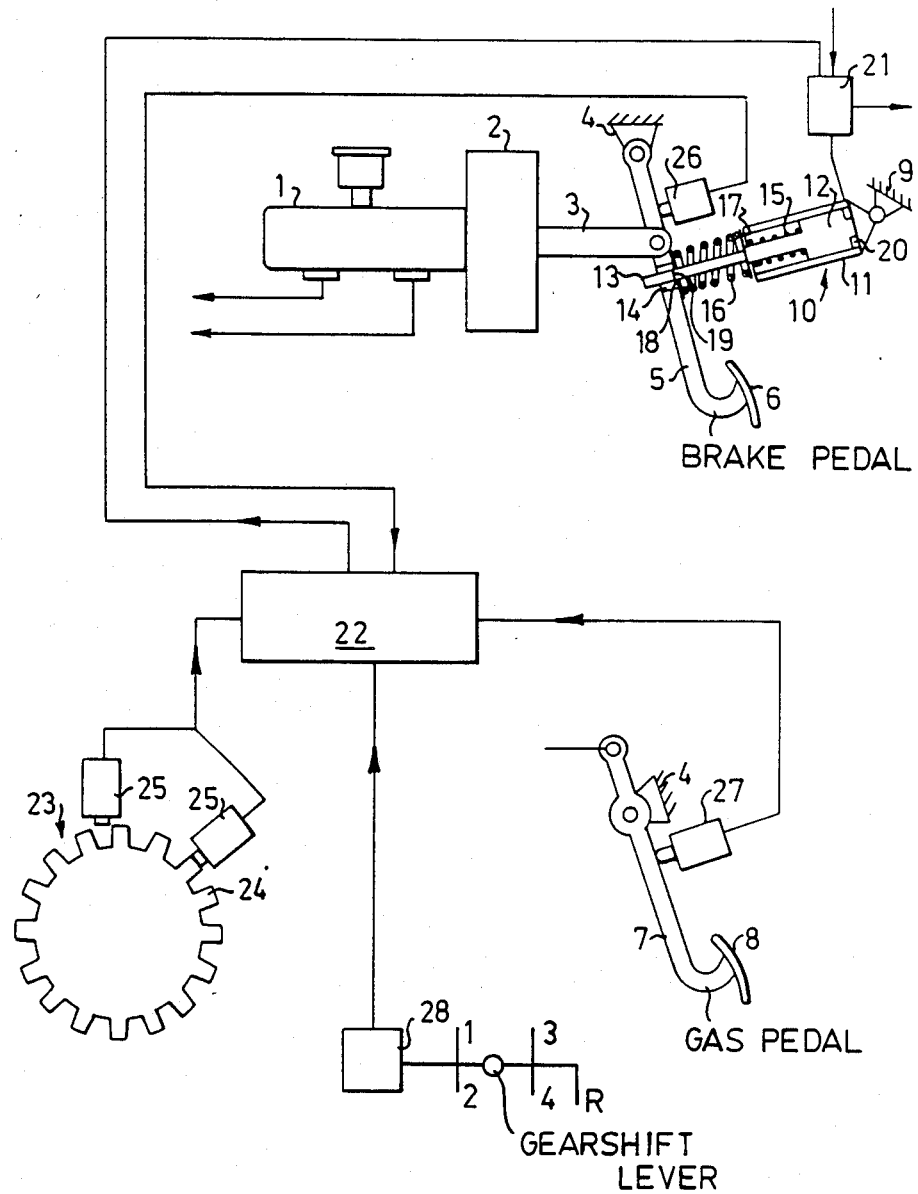

MOTOR, BRAKE AND BEARING CONTROLLED HILL HOLDER

The present invention relates to a device for use in a brake system for motor vehicles for facilitating starts on an upward incline.

When starting on a hill, the handbrake is normally used. In this case it is important to carefully coordinate releasing the handbrake with depressing the accelerator and engaging the clutch to prevent the vehicle from rolling down-hill initially. Many drivers feel this to be a difficult maneuver and therefore, when driving in congested traffic on an upward incline, choose to "ride" the clutch; i.e. instead of moving one's foot from the accelerator to the brake pedal, the accelerator is depressed somewhat and the clutch pedal is depressed enough to make the clutch slip sufficiently to keep the vehicle stationary. This driving technique results in heavy wear on the clutch discs and, with frequent use, shortens the life of the discs considerably.

The purpose of the present invention is to provide an automatic aid which "takes over" the function of the handbrake when starting on a hill.

This is achieved according to the invention by means of a device which has a force actuating means acting between a fixed vehicle part and the manually activated control brake mechanism of the vehicle; a control unit for controlling the force actuating means; a first sensor which provides to the control unit a signal representing vehicle speed and direction of movement; a second sensor coupled to the manual brake activating mechanism and connected to the control unit; and a third sensor coupled to the vehicle throttle control mechanism and connected to the control unit; said control unit being arranged to activate the force actuating means to brake the vehicle when the first sensor provides a signal indicating zero speed after having previously given a signal indicating movement in a direction different from the selected direction indicated by a fourth sensor connected to the control unit at the same time as the second sensor sends a signal indicating that the brake control mechanism has been actuated and the third sensor sends a signal indicating little or no throttle opening, and deactivates the force actuating means when the throttle control mechanism is actuated and the throttle opening exceeds a certain predetermined level.

A significant advantage of the device according to the invention is that it can be easily adapted to veh:cles already in production. This is due to the fact that it does not need to be integrated in the existing brake system but can be made as an addition, with existing components such as the brake light switch and the toothed wheel in the electronic speedometer being included in the sensors.

The invention will be described in more detail with reference to an example shown in the accompanying drawing. The figure shows a schematic view of the device according to the invention.

In the figure, 1 designates a main cylinder in a two-circuit brake system and 2 designates a servo unit, the operating rod 3 of which is coupled to a pedal arm 5 of a brake pedal 6, which arm is swingably journalled in a pedal rack 4. A gas pedal arm 7 with pedal 8 is also swingably journalled in the pedal rack 4.

A piston cylinder device 10 is mounted between a fixed body mounting 9 and the brake pedal arm 5. Its cylinder 11 is articulated to the mounting 9, while the piston rod 13 of the piston 12 slides in a sleeve 14 pivotally joined to the pedal arm 5. The piston rod 13 is surrounded by a first helical spring 15 which serves as a return spring and loads the piston 12 towards the position shown in the figure, and a second helical spring 16, which is mounted under tension between a first washer 17 lying against a stop surface on the piston rod and a second washer 18 which is displaceable to the right along the piston rod from the position shown, but which is prevented from moving to the left by a retaining ring 19. The piston 12 thus presses the pedal arm 5 in the braking direction via the spring 16, when pressure medium is supplied to the cylinder space 20 on the right hand side of the piston.

The cylinder space 20 is connected via a magnetic valve 21 to an hydraulic or pneumatic pressure system and is controlled by an electronic unit generally designated 22. In response to the various input signals to the electronic unit 22, it sets the magnetic valve 21 either in one position in which the cylinder chamber 20 is pressurized or in another position in which the cylinder chamber is drained. These input signals are obtained from a number of sensors. A first sensor 23 is formed of a toothed wheel 24 and two sensors 25. The toothed wheel is driven for instance by the output shaft of the transmission and can be a component in an electronic speedometer in the car. The sensor 23 sends signals to the electronic unit 22, which represents the speed and direction of the vehicle. A second sensor 26 coupled to the brake pedal and consisting of an on-off switch, which can be the brake light switch of the vehicle, sends signals to the electronic unit thus stating whether the brake pedal has been actuated or not.

A third sensor 27, corresponding to the sensor 26 is coupled to the gas pedal and provides information concerning depression of the gas pedal. The sensor 27 can be arranged so that it switches at the slightest movement of the gas pedal from the idle position or so that a certain depression with accompanying greater throttle opening is permitted before switching. A fourth sensor 28 detects whether the shift lever is in the neutral position or in one of its gear speed positions.

The electronic unit 22 is arranged to open the magnetic valve 21 and establish communication between the system and the cylinder chamber 20 of the piston cylinder device, when (a) the sensor 23 indicates speed zero as the final speed of a movement in a direction different from the selected direction as indicated by the sensor 28, (b) the sensor 26 indicates that the brake pedal is depressed and (c) the sensor 27 indicates that the gas pedal is not depressed.

These indications are obtained when the vehicle begins to roll in a direction different from that indicated by the sensor 28 and the driver moves his foot from the gas pedal to the brake pedal and brakes the vehicle to a stop. He can then remove his foot from the brake pedal 6 which continues to be held depressed by the piston cylinder device 10 via the spring 16. When the gas pedal is depressed the magnetic valve 21 will be switched so that the cylinder chamber 20 is drained, and the return spring 15 will push the piston in and thus end the auxiliary braking function, provided that the gear selector sensor indicates that the gear selector is not in the neutral position.

Normal braking is done completely independently of the auxiliary system by virtue of the fact that the piston rod 13 slides in the sleeve 14 and thus does not prevent swinging of the pedal arm 5. By virtue of the fact that the piston cylinder device presses the pedal via a spring 16, the braking force can be limited to that needed to halt the vehicle if it begins to roll backwards. Furthermore, the braking force can be controlled by arranging the electronic unit so that the piston cylinder device 10 is kept deactivated if a braking movement initiated by the driver produces a deceleration which exceeds a certain predetermined level. Controlled braking force is very important with regard to comfort and safety.

The invention can of course be modified within certain limits; for example the sensor 27 can be replaced with a tachometer already mounted in the vehicle. The electronic unit can be based on a microcomputer. As regards the magnitude of the throttle opening before the auxiliary braking function is removed, this can be simply adjusted to various engine settings by selecting a suitable "play" in the switch forming the gas pedal sensor 27.

We claim:

1. Device in a brake system for motor vehicles to facilitate starting on upward inclines, comprising a force actuating means acting between a fixed vehicle part and a manually activated brake control mechanism of the vehicle, said actuating means being directly mechanically connected to said brake control mechanism; a control unit for controlling the force actuating means; a first sensor connected to the control unit which provides to the control unit a signal representing vehicle speed and direction of movement; a second sensor coupled to the manual brake control mechanism and connected to the control unit; and a third sensor coupled to a vehicle control mechanism for controlling the opening of a throttle of the vehicle and connected to the control unit; said control unit being arranged to activate the force actuating means to brake the vehicle when the first sensor provides a signal indicating zero speed after having previously given a signal indicating movement in a direction different from the selected direction indicated by a fourth sensor connected to the control unit at the same time that the second sensor sends a signal indicating that the brake control mechanism has been actuated and the third sensor sends a signal indicating little or no throttle opening, and to deactivate the force actuating means when the vehicle control mechanism is actuated and the throttle opening exceeds a certain predetermined level.

2. Device according to claim 1, characterized in that the control unit is arranged to hold the force actuating means in the deactivated state when deceleration exceeds a predetermined value.

3. Device according to claim 1, characterized in that the fourth sensor is a sensor coupled to a vehicle gear change mechanism and arranged to provide a signal to the control unit indicating either gear selection or neutral.

4. Device according to claim 1, characterized in that the control unit is an electronic unit.

5. Device according to claim 1, characterized in that the first sensor is a sensor formed of a toothed wheel with double sensors and that the second and third sensors are on/off switches.

6. Device according to claim 1, characterized in that the force actuating means is fluid piston cylinder device arranged between a fixed vehicle part and the vehicle brake pedal.

7. Device according to claim 6, characterized in that the electronic unit controls a magnetic valve in a fluid pressure system connected to the piston cylinder device.

8. Device according to claim 6, characterized in that the piston cylinder device is arranged to load the brake pedal via a spring means.

9. Device according to claim 6, characterized in that the piston cylinder device has a piston rod extending out of the cylinder and surrounded by a helical spring, the outer end of said piston rod being slidable in a sleeve member joined to the brake pedal, said helical spring being placed between inner and outer abutments, of which the outer abutment is displaceable along the piston rod from an outer end position towards the inner abutment as the spring is compressed.

* * * * *